A. E. HOLADAY.
PRESSURE SCREW FOR CLOTHES WRINGERS.
APPLICATION FILED JAN. 8, 1917.
1,289,450.
Patented Dec. 31, 1918.
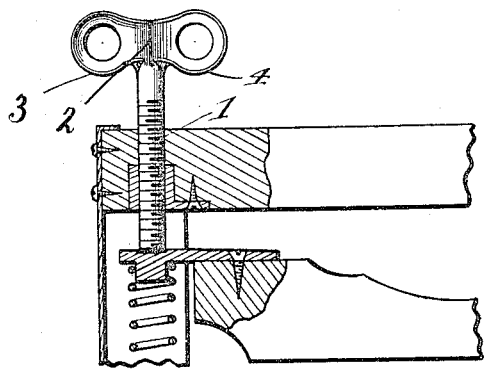
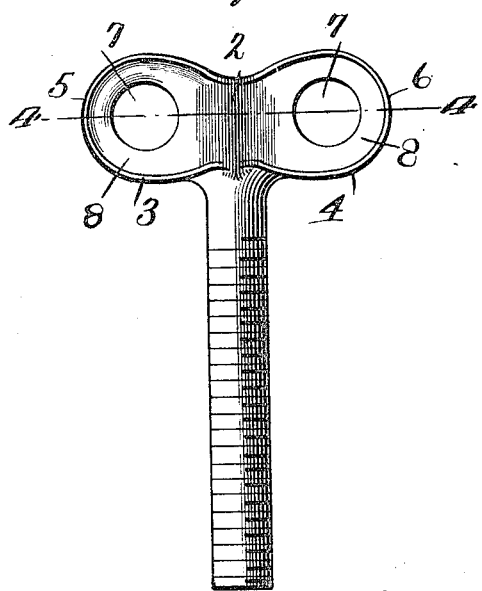
Inventor
A. E. Holaday.

UNITED STATES PATENT OFFICE.

ALBERT E. HOLADAY, OF NAUGATUCK, CONNECTICUT, ASSIGNOR TO THE AMERICAN WRINGER COMPANY, OF PROVIDENCE, RHODE ISLAND, A CORPORATION OF RHODE ISLAND.

PRESSURE-SCREW FOR CLOTHES-WRINGERS.

1,289,450.  Specification of Letters Patent.  Patented Dec. 31, 1918.

Application filed January 8, 1917. Serial No. 141,242.

*To all whom it may concern:*

Be it known that I, ALBERT E. HOLADAY, a citizen of the United States, residing at Naugatuck, in the county of New Haven and State of Connecticut, have invented certain new and useful Improvements in Pressure-Screws for Clothes-Wringers, of which the following is a specification, reference being had therein to the accompanying drawing.

This invention relates to certain new and useful improvements in pressure screws for clothes wringers, the object being to provide a pressure screw which can be readily grasped by the hand of the operator in such a manner that the same can be turned to adjust the pressure on the pressure rolls of the wringer without any danger of the hand slipping off of the pressure screw.

Another object of my invention is to provide a pressure screw which is exceedingly simple and cheap in construction, the same being constructed with a head having recessed wings to receive the fingers.

Other and further objects and advantages of the invention will be hereinafter set forth and the novel features thereof defined by the appended claims.

In the accompanying drawing,

Figure 1 is a detail view of a portion of a clothes wringer, showing the application of my improved construction of pressure screw thereto;

Fig. 2 is a top plan view of a screw;

Fig. 3 is a side elevation of the pressure screw; and

Fig. 4 is a section taken on line 4—4 of Fig. 3.

Like numerals of reference refer to like parts in the several figures of the drawing.

In the use of a pressure screw in connection with a clothes wringer for adjusting the tension on the pressure rolls, it is often necessary when the wringer is in operation to adjust the tension on the pressure rolls, and generally the operator's hands are wet and soapy so that it becomes extremely difficult to manipulate the screws and for this purpose I have provided a pressure screw with a head having recessed wings so constructed that the same can be grasped by the operator in order to allow the same to be readily manipulated.

In carrying out my invention I employ a threaded shank 1 which is provided with a head 2 having oppositely disposed wings 3 and 4 which are enlarged at their outer ends as shown at 5 and 6. The wings are provided with apertures 7 surrounded by counter-sunk portions 8 forming recesses to receive the thumb and finger in such a manner that the screw can be readily manipulated without any danger of the fingers slipping off of the wings.

In Fig. 4 I have shown a sectional view through the head and wings of my improved construction of pressure screw which clearly illustrates the configuration of the wings to produce recesses to receive the thumb and finger, and it will be noted that by enlarging the outer ends of the wings, the flanges thus formed as shown at 9 form stops so as to prevent the fingers from slipping endwise on the wings when the same is grasped by the operator.

I have found in practice that a pressure screw constructed as herein shown and described can be grasped by an operator when his hand is wet or soapy without any danger of the hand slipping whereby the clothes wringer to which the pressure screw is applied can be readily adjusted.

I claim:

As a new article of manufacture, a pressure screw for clothes wringers, comprising a threaded shank having a head provided with oppositely disposed apertured wings, said wings being enlarged transversely at their outer ends to provide flanges, the apertures of said wings being surrounded by countersunk portions to provide finger receiving recesses.

In testimony whereof I hereunto affix my signature.

ALBERT E. HOLADAY.

Copies of this patent may be obtained for five cents each, by addressing the "Commissioner of Patents, Washington, D. C."